June 22, 1965     I. EPSTEIN     3,190,063
FLEXIBLE TRIMMER FOR A LAWNMOWER
Filed June 5, 1964

INVENTOR.
ISIDORE EPSTEIN

BY his   ATTORNEYS

United States Patent Office 3,190,063
Patented June 22, 1965

3,190,063
FLEXIBLE TRIMMER FOR A LAWNMOWER
Isidore Epstein, New Hyde Park, N.Y., assignor to G. W. Davis Corporation, Richmond, Ind., a corporation of Indiana
Filed June 5, 1964, Ser. No. 372,750
1 Claim. (Cl. 56—255)

This invention relates in general to lawn mower equipment and, more particularly, to an improved trimmer feature for deflecting grass or vegetation into the housing of a rotary mower.

Heretofore, rotary mowers with trimmer features have been developed which consist merely of an aperture cut in the side surface of the housing of the rotary mower. As is true with all trimmers, it was the purpose of these prior art devices to permit the cutting of grass or vegetation growing directly adjacent a vertical surface which would normally be beyond the sweep of the rotating blade within the housing. These prior art devices attempted to accomplish this trimming function by bending the grass adjacent the vertical surface and forcing it through the apertures in the side of the rotary mower housing.

However, in practice, it was often extremely difficult for the operator to maneuver the aperture in the casing to a point directly adjacent a particular vertical structure and, in fact, the positioning of the trimmer proved to be exceptionally difficult when the vertical structure had a small concave surface or a series of concave surfaces along the vertical surface adjacent the vegetation or grass which the operator desired to cut. In these cases, the rigid trimmer opening of the prior art devices was totally ineffective.

In addition to the above, the fact that the edges of a rigid trimmer opening, which are formed by portions of the housing, are continually subjected to sharp impacts when the operator attempts to move the trimmer to a position adjacent a solid vertical wall, has severely curtailed the effective use of these rigid trimmer designs. The direct impact between the mower housing and the vertical structure often resulted in damage to either the housing or the vertical structure, and has, in many cases, needlessly shortened the life of the rotary mower.

This invention solves all of these problems by permitting the operator of the rotary mower to cut vegetation in shallow concave areas adjacent curved retaining walls and by permitting him to approach rigid vertical structures without fear that the mower housing will be damaged by such operation. In addition, the device disclosed in this invention provides a means for deflecting vegetation adjacent vertical structures into a rotary mower with far greater efficiency than has been heretofore possible when using similar devices. This is accomplished by presenting a narrow flexible leading edge, which is designed to travel directly adjacent the vertical wall, thereby moving all of the vegetation away from the wall and into the aperture in the mower housing. It is the flexibility of this deflector which provides these features and safeguards the housing of the mower.

Specifically, this invention discloses a flexible deflector positioned adjacent the rearward or outer edge of an aperture in the side of the rotary mower housing. This flexible deflector naturally widens the scope of the trimmer and permits the mower to cut vegetation within deeper concave openings. However, it is the flexibility of this deflector which permits the operator to move adjacent a nonlinear vertical surface with far greater efficiency than was heretofore possible. With this device, the flexible deflector is free to move inwardly and outwardly and follow the exact contours of a curving vertical surface.

Still further, with this invention the operator of the rotary mower can approach the vertical surface with confidence that the rotary mower housing will not be damaged in his attempt to cut the grass or vegetation adjacent the vertical wall. When using this invention, the operator can now rely on the fact that the flexibility of the deflector will absorb any possible error in his judgment and that any slight variations in distance between the position of the vertical structure and the position of the rigid side wall of the rotary housing will neither affect the efficiency of the trimmer in deflecting grass into the aperture in the rotary mower housing nor risk damaging the vertical structure of the housing itself. The fact that the operator can now move the mower quickly and with confidence when proceeding adjacent vertical surfaces not only improves the effectiveness of the mowing operation in general, but greatly reduces the time necessary to accomplish this task.

Other advantages and a fuller understanding of this invention may be had by referrring to the following description and claim taken in conjunction with the accompanying drawings in which:

Figure 1:
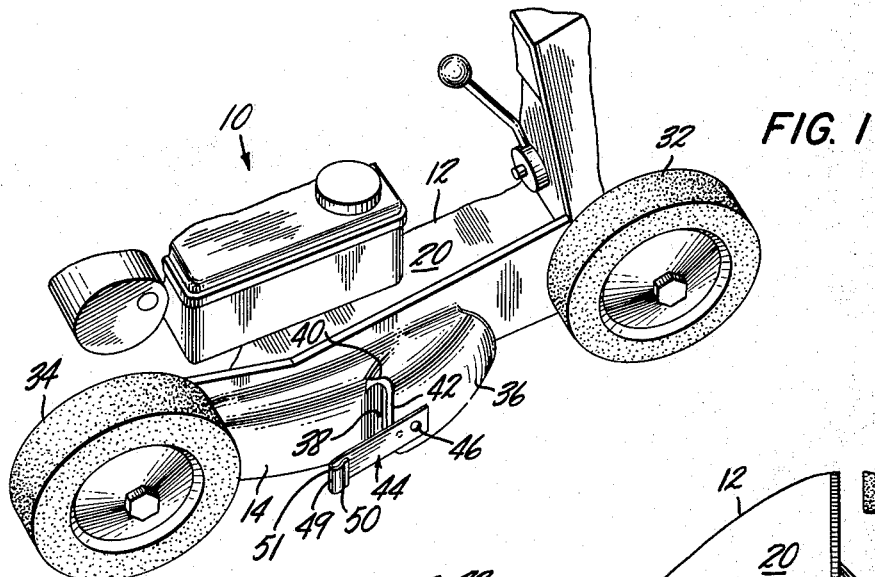
FIGURE 1 shows a partial isometric view of the side of a lawn mower incorporating the invention.

With reference to the drawings, the invention is illustrated as being incorporated in a rotary mower illustrated by the reference character 10 and comprising a mower housing 12 having a curved side surface 14. A central rotatable shaft 16, which is driven by a motor 18, is mounted on the upper surface 20 of housing 12. In the preferred embodiment shown in the drawings, the motor 18 is powered by gas supplied from fuel tank 22 and is turned on by starting element 24 which is mounted above motor 18 and connected to the upper end of shaft 16. The lower end of shaft 16 is connected to cutting blade 26 which rotates within an inner chamber in housing 12, formed by the upper housing surface 20 and the rounded side surface 14. The mower casing 12 is supported by four adjustable wheel assemblies, two of which, the left rear wheel 32 and the left front wheel 34, are shown in FIG. 1.

Adjacent rounded side surface 14 and integral therewith, is a protruding portion 36 which extends beyond the normal radius or perimeter of side 14. This protruding portion 36 forms on its forward side an aperture 38 which is defined by the side surface 14, the upper covering element 40, and the guiding edge 42. In the preferred embodiment, this aperture 38 is shown facing generally in the forward direction in order to facilitate more easily the deflection of grass or vegetation into the rotary mower housing.

Adjacent the generally vertical outer side surface of protruding portion 36 and adjacent the outer edge 42 of aperture 38, is flexible deflector 44 which is fastened to the side of protruding portion 36 by the fastening means 46. In the preferred embodiment the outer end of deflector 44 curves outwardly and rearwardly so as to present a smooth leading edge 49 for making initial contact with the grass or vegation which is to be deflected. In addition, flexible deflector 44 presents a smooth surface 51 leading toward aperture 38. Finally, in the preferred embodiment, leading edge 49 of flexible deflector 44 curves rearwardly and inwardly on its outer side, away from the mower, so as to present a smooth rounded surface 50 for contact with a vertical wall 52, as shown in FIG. 3.

Figures 2, 3:
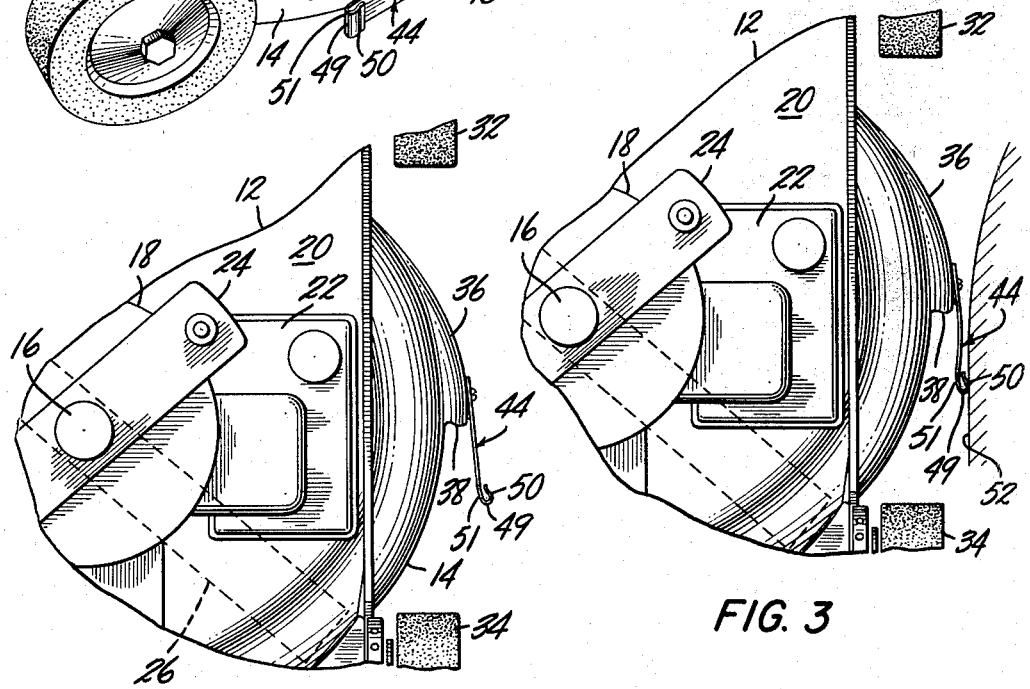
FIGURE 2 shows a partial plan view of a rotary mower of FIG. 1 with the flexible trimmer in a nonoperative position.
FIGURE 3 illustrates a partial plan view of a rotary mower of FIG. 1 with the flexible trimmer in a deflected position moving adjacent a rigid vertical surface.

In operation, the deflecting or leading edge 49 of flexible deflector 44 tends to direct grass or vegetation toward aperture 38 when the mower is moving freely across an open lawn, as shown in FIG. 2. Here the flexible deflector 44 is in its natural unstrained position. However, when the operator wishes to cut vegetation adjacent the vertical wall 52 as shown in FIG. 3, he merely directs the side of the mower with the trimmer feature to a position approximately adjacent to this wall 52 and continues to move the mower parallel to its vertical surface.

As the operator moves the rotary mower in this position, the rounded surface 50 of flexible deflector 44 engages the vertical surface of wall 52. Since the operator may have difficulty estimating and maintaining the mower at a specific distance from the vertical wall 52, the flexible deflector 44 will bend inwardly and outwardly as this distance varies, as shown in FIG. 3. However, although the pressure between rounded surface 50 of flexible deflector 44 and the vertical surface of wall 52 will vary in direct proportion with this distance, the engagement between the wall 52 and the rounded surface 50 will at all times be maintained so that any vegetation positioned in advance of the deflector will be moved away from the vertical structure and toward the aperture 38.

Also, as shown in FIG. 3, the surfaces of wall 52 and similar structures are not always linear, a fact which heretofore made it virtually impossible to sever vegetation growing adjacent these structures by machine, since it was impossible to maintain the mower at a specific distance from the vertical surface of wall 52. These difficulties are, however, overcome by the flexible deflector 44 which moves freely to compensate for these variations in distances between the aperture 38 and the vertical structure 52.

In the preferred embodiment described above, the flexible deflector 44 is fastened to the protruding portion 36 in such a manner that it makes a slight outwardly inclined angle with the directional axis of the mower. It is this transverse or sideward component of the deflector 44, the component extending in the direction perpendicular to the movement of the mower, that provides the flexible safeguard for housing 12.

Although the preferred embodiment of this invention discloses a protruding portion 36 extending from the side 14 of the rotary mower, other embodiments are envisioned wherein the trimmer is merely an aperture cut in the side surface of the mower in combination with a flexible member attached to the rearward edge of this aperture. Also, apertures facing at various angles in a forward direction are contemplated and are to be considered within the scope of this invention in addition to merely forward facing apertures or apertures facing the side of the rotary mower. Thus, although the invention has been described with a certain degree of particularity, it is to be understood that the present disclosure has been made only by way of example and that numerous changes in the details of construction and the combination and arrangement of parts may be resorted to without departing from the spirit and scope of the invention as hereafter claimed.

I claim:

A trimmer for a lawnmower adaptable for deflecting vegetation into the path of the blade of the mower comprising, a rotary mower housing having an aperture in its side surface, said aperture defined in part by an outer edge, and flexible deflecting means for deflecting vegetation growing adjacent a vertical surface into said aperture even when said vertical surface is uneven and the distance between said aperture and said vertical surface constantly varies, said deflecting means being rigidly attached to said housing adjacent to said outer edge of said aperture and making an acute and diverging angle with the forward directional axis of said rotary mower, said deflecting means also having a forward, outer, rounded surface substantially adjacent the forward surface of said deflector for smoothly engaging the vertical surface of a rigid structure at any one of a plurality of points along its rounded perimeter and having a smooth inner surface proceeding to said aperture for deflecting vegetation along a path adjacent the inner surface, through the aperture, and into said blade of said rotary mower.

References Cited by the Examiner
UNITED STATES PATENTS

| 1,814,991 | 7/31 | Wetmore | 56—249 |
| 2,312,972 | 3/43 | Orr | 56—25.4 |
| 2,523,439 | 9/50 | May | 56—25.4 |
| 2,719,396 | 10/55 | Morris et al. | 56—25.4 |
| 2,880,563 | 4/59 | Nottemeyer | 56—25.4 |

ANTONIO F. GUIDA, *Acting Primary Examiner.*
RUSSELL R. KINSEY, *Examiner.*